United States Patent [19]
Coulson et al.

[11] 4,430,712
[45] Feb. 7, 1984

[54] ADAPTIVE DOMAIN PARTITIONING OF CACHE MEMORY SPACE

[75] Inventors: Richard L. Coulson; Ronald L. Blickenstaff; P. David Dodd; Robert J. Moreno, all of Boulder; Dean P. Kinard, Longmont, all of Colo.

[73] Assignee: Storage Technology Corporation, Louisville, Colo.

[21] Appl. No.: 325,351

[22] Filed: Nov. 27, 1981

[51] Int. Cl.³ .............................................. G06F 13/00
[52] U.S. Cl. ..................................... 364/300; 364/200
[58] Field of Search ... 364/200 MS File, 900 MS File, 364/300; 365/77, 189

[56] References Cited

U.S. PATENT DOCUMENTS

| | | | |
|---|---|---|---|
| 3,142,043 | 7/1964 | Schrimpf | 364/200 |
| 3,585,600 | 6/1971 | Saltini | 364/200 |
| 3,906,455 | 9/1975 | Houston et al. | 365/77 |
| 4,028,668 | 6/1977 | Riikonen | 364/200 |
| 4,035,778 | 7/1977 | Ghanem | 364/200 |
| 4,047,243 | 9/1977 | Dijkstra | 364/200 |
| 4,080,651 | 3/1978 | Cronshaw et al. | 364/200 |
| 4,096,567 | 6/1978 | Millard et al. | 364/200 |
| 4,115,854 | 9/1978 | Capowski et al. | 364/200 |
| 4,161,024 | 7/1979 | Joyce et al. | 364/200 |
| 4,195,342 | 3/1980 | Joyce et al. | 364/200 |
| 4,219,883 | 8/1980 | Kobayashi et al. | 365/189 |
| 4,315,312 | 2/1982 | Schmidt | 364/200 |

Primary Examiner—Jerry Smith
Assistant Examiner—William G. Niessen
Attorney, Agent, or Firm—Woodcock, Washburn, Kurtz, Mackiewicz & Norris

[57] ABSTRACT

A method of operation of a memory array for storage of records of differing predetermined sizes is disclosed which features division of the array into domains which are substantially integral multiples of the predetermined record sizes. In a preferred embodiment the domain allocation may be varied adaptively in accordance with usage so as to enable more fully efficient use of the array.

6 Claims, 4 Drawing Figures a. 8650 − 19,069 × 13

| FR1 | FR2 | FR3 | FR4 | FR5 | FR6 | FR7 |
|---|---|---|---|---|---|---|
| FR7 | FR8 | FR9 | FR10 | FR11 | FR12 | FR13 | b. 8375 − 37,000 × 6

| FR1 | FR2 | FR3 |
|---|---|---|
| FR4 | FR5 | FR6 | c. 8380 − 47,476 × 5

| FR1 | FR2 | FR3 |
|---|---|---|
| FR3 | FR4 | FR5 |

| DOMAINS ALLOCATED TO DEVICE TYPE A | "A USE" | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | A | B | C | D | E | F |
| 0 | n | n | a | a | a | a | a | a | a | a | a | a | a | a | a | a |
| 1 | b | n | n | a | a | a | a | a | a | a | a | a | a | a | a | a |
| 2 | b | n | n | a | a | a | a | a | a | a | a | a | a | a | a | a |
| 3 | b | b | n | n | n | a | a | a | a | a | a | a | a | a | a | a |
| 4 | b | b | b | n | n | n | a | a | a | a | a | a | a | a | a | a |
| 5 | b | b | b | b | n | n | n | a | a | a | a | a | a | a | a | a |
| 6 | b | b | b | b | b | n | n | n | a | a | a | a | a | a | a | a |
| 7 | b | b | b | b | b | b | n | n | n | a | a | a | a | a | a | a |
| 8 | b | b | b | b | b | b | b | n | n | a | a | a | a | a | a | a |
| 9 | b | b | b | b | b | b | b | b | n | n | n | a | a | a | a | a |
| A | b | b | b | b | b | b | b | b | b | n | n | n | a | a | a | a |
| B | b | b | b | b | b | b | b | b | b | b | n | n | n | a | a | a |
| C | b | b | b | b | b | b | b | b | b | b | b | n | n | n | a | a |
| D | b | b | b | b | b | b | b | b | b | b | b | b | n | n | n | a |
| E | b | b | b | b | b | b | b | b | b | b | b | b | b | n | n | a |
| F | b | b | b | b | b | b | b | b | b | b | b | b | b | b | n | n |

Fig. 2 a) 8650 – 19,069 × 13

| FR1 | FR2 | FR3 | FR4 | FR5 | FR6 | FR7 |
|-----|-----|-----|-----|-----|-----|-----|
| FR7 | FR8 | FR9 | FR10 | FR11 | FR12 | FR13 | b) 8375 – 37,000 × 6

| FR1 | FR2 | FR3 |
|-----|-----|-----|
| FR4 | FR5 | FR6 | c) 8380 – 47,476 × 5

| FR1 | FR2 | FR3 |
|-----|-----|-----|
| FR3 | FR4 | FR5 |

Fig. 3

| DOMAINS ALLOCATED TO DEVICE TYPE A | "A USE" | | | | | | | | | | | | | | | |
|---|---|---|---|---|---|---|---|---|---|---|---|---|---|---|---|---|
|  | 0 | 1 | 2 | 3 | 4 | 5 | 6 | 7 | 8 | 9 | A | B | C | D | E | F |
| 0 | n | n | a | a | a | a | a | a | a | a | a | a | a | a | a | a |
| 1 | b | n | n | a | a | a | a | a | a | a | a | a | a | a | a | a |
| 2 | b | n | n | a | a | a | a | a | a | a | a | a | a | a | a | a |
| 3 | b | b | n | n | a | a | a | a | a | a | a | a | a | a | a | a |
| 4 | b | b | b | n | n | n | a | a | a | a | a | a | a | a | a | a |
| 5 | b | b | b | b | n | n | n | a | a | a | a | a | a | a | a | a |
| 6 | b | b | b | b | b | n | n | n | a | a | a | a | a | a | a | a |
| 7 | b | b | b | b | b | b | n | n | n | a | a | a | a | a | a | a |
| 8 | b | b | b | b | b | b | b | n | n | n | a | a | a | a | a | a |
| 9 | b | b | b | b | b | b | b | b | n | n | n | a | a | a | a | a |
| A | b | b | b | b | b | b | b | b | b | n | n | n | a | a | a | a |
| B | b | b | b | b | b | b | b | b | b | b | n | n | n | a | a | a |
| C | b | b | b | b | b | b | b | b | b | b | b | n | n | n | a | a |
| D | b | b | b | b | b | b | b | b | b | b | b | b | n | n | n | a |
| E | b | b | b | b | b | b | b | b | b | b | b | b | b | n | n | a |
| F | b | b | b | b | b | b | b | b | b | b | b | b | b | b | n | n |

ADAPTIVE DOMAIN PARTITIONING OF CACHE MEMORY SPACE

FIELD OF THE INVENTION

This invention relates to data storage management and control. More particularly, the invention relates to a memory system wherein a solid-state cache memory used in conjunction with long-term magnetic disk storage devices of varying types can be subdivided into blocks or "domains" of sizes chosen so as to insure efficient cache memory utilization despite varying demands placed on the system.

BACKGROUND OF THE INVENTION

The present invention relates to a solid-state cache memory subsystem designed to be used primarily as an adjunct to long-term magnetic disk storage media. The cache memory is connected outboard of a conventional data transmission channel not specially designed for use with such a cache memory sub-system, such that the cache memory system is plug-compatible with and software transparent to a host computer. In particular, the invention is designed to operate in accordance with the cache memory subsystem which is the subject matter of copending patent application Ser. No. 325,346 filed Nov. 27, 1981 incorporated herein by reference. That application describes a cache memory subsystem which is operatively connected to storage director(s) which in turn are connected between a host computer at one point and the control modules at another. In turn the control modules connect to the actual disk drive. As is known in the art, the directors serve to interface the host with the control modules which in turn interface the directors to the disk drives. The control modules are selected in accordance with the particular type of disk drive used while the directors may be used with various types of control modules and hence with various types of disk drives. According to the invention of that application, the cache is adapted to be used with varying sorts of disk drives by connection to the director(s).

The function of the solid-state cache memory subsystem in the invention of the copending application referred to above is to store certain data which has been determined to be likely to be called for by the host in advance of an actual host request for that certain data. This determination is done in accordance with the invention disclosed in another copending application, Ser. No. 325,350 filed Nov. 27, 1981, also incorporated herein by reference. In a preferred embodiment of that invention, once it has been determined that a particular block of data is likely to be called for by the host, the entire disk track containing that block of data is brought into the cache memory for temporary storage in anticipation of its being called for by the host computer. Inasmuch as the cache memory subsystem must be adapted to cooperate with varying types of disk drives which in turn have varying amounts of data stored on a given track, means must be provided whereby the cache memory is as useful as is possible despite the fact that disk tracks of varying sizes will be stored therein track by track. For example, if it were assumed that the total cache memory was to contain 200 kilobytes (hereinafter 200 kb) of data, and the track length of a particular disk drive was 20 kb, 10 such tracks would fit into the cache. Stated slightly differently, the cache could be divided into ten 20-kb "frames". When, for example, all ten frames were full and it was desired to cache another track, a cache manager could then simply deallocate a frame, for example a frame containing the data which had been least recently used and then allocate that frame to the new track. However, if data stored on another type of disk drive having a track size of, say, 25 kb, were desired to be staged, it would be necessary to deallocate two adjacent 20 kb frames in order to accommodate a 25 kb track thus wasting 15 kb of space. Even assuming two adjacent frames could be deallocated without loss of useful data, the waste of space alone would clearly be undesirable. If on the other hand the entire solid-state memory were divided into one subportion or "domain" adapted to store only tracks of one size, and another subportion proportioned to storage of tracks of another size, the individual domains of the memory might be efficiently allocated. However, utility of this solution presupposes that the relative activity of the two sizes of tracks is constant over time, which cannot be expected to be the case. Thus, it is desirable that all area of the solid state memory be accessible to any track size supported by the cache in order that it can be most efficiently used. Finally, one could divide all track sizes into much smaller uniformly-sized "pages", e.g., 2 kb, which would fit fairly uniformly within the frames. However, this would require complex hardware to implement and would additionally reduce the efficiency of the cache as necessarily an individual disk track would tend to be stored on varying portions of the cache, which would entail substantial additional support, e.g. recall of the numerous storage locations of the portions of a given track.

OBJECTS OF THE INVENTION

It is accordingly an object of the present invention to provide a means whereby the storage area available in a solid-state cache memory can be most efficiently used.

It is a further object of the invention to provide a method whereby a solid-state cache memory subsystem can be operated efficiently to store data records of varying sizes.

It is a further object of the invention to provide a means for "adaptively" or "dynamically" reconfiguring a cache memory previously divided into domains of plural classes in accordance with actual use, so as to fully utilize the memory space available.

SUMMARY OF THE INVENTION

The above needs of the art and objects of the invention are satisfied by the present invention according to which a solid-state memory is subdivided into domains. The size of the domains is chosen to be a substantially integral multiple of each of the track sizes desired to be stored therein, such that, for example, three 50-kb tracks from one class of device will fit within the same 150-kb domain as two 75-kb tracks from another class. Each individual domain is thereafter assigned to storage of tracks from a given type of device, and then divided into track-sized frames, to which individual tracks are written. Statistics are maintained on domain usage. If the indications are that the data staged from a particular device type predominates over another, a given domain is reallocated from the second device type to the first device type so as to insure efficient usage of the total memory space available. In this way, fragmentation due to intermingling of varying track sizes in the same area of memory is avoided.

BRIEF DESCRIPTION OF THE DRAWINGS

The invention will be better understood if reference is made to the accompanying drawings, in which:

FIG. 2 shows how individual domains can be subdivided according to the track sizes desired to be stored therein;

FIG. 3 shows a domain switching decision table used in determining which domains to switch at a particular time.

DESCRIPTION OF THE PREFERRED EMBODIMENTS

As discussed above, the adaptive domain partitioning methods of the invention are designed to be used in a solid-state cache memory subsystem operated to contain data being stored on disk memory in anticipation of its being called for by a host computer.

Figure 1:
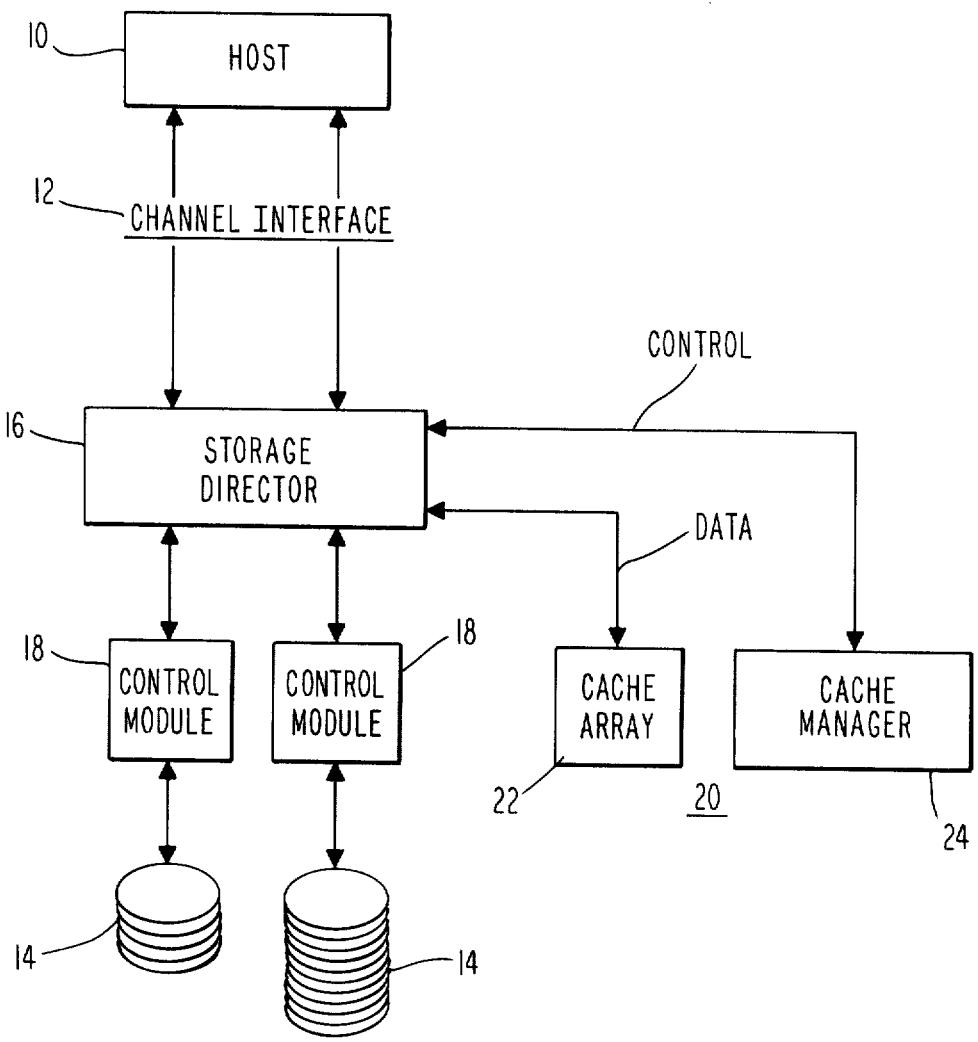
FIG. 1 represents a schematic block diagram view of the system of the invention.

FIG. 1 shows a schematic diagram of such a system. The host computer 10 is connected by means of a conventional channel interface 12 to a storage director 16. The storage director in turn interfaces to plural control modules 18 which themselves control disk drives 14 which as shown may be of differing types. In particular, the amount of data stored on a given track of one of the disks 14 can vary. When a decision is made by a cache manager 24, e.g. in accordance with copending application Ser. No. 325,350 filed Nov. 27, 1981, that it would be desirable to store the entire contents of a track in a solid-state cache memory array 22, a number of locations in the cache corresponding in size to the length of the track on the disk 14—i.e., a "frame" of locations in the cache—must be assigned to the data. When it is desired by the cache manager that a particular track be staged into a frame in the cache array 22, a frame is assigned to that track and the operation proceeds. The present invention is concerned with efficient division of the cache array into subportions or "domains". The size of the domains is chosen so that approximately integral numbers of disk tracks of varying lengths fit into "frames" in each domain. Thus, after allocation of the domain to a particular track length, it is divided into "frames" of sizes corresponding to the track lengths.

It can be expected that at some point all the domains allocated to tracks of a particular length would be heavily in use, while those allocated to disk tracks of other type(s) were not. According to an important aspect of the present invention, the domains are chosen to all be of the same size so that they can be efficiently reallocated to contain data stored on a different type of disk memory device. The domains are "dynamically" repartitioned into frames of a different size according to usage. For this reason, the domain size is chosen such that the domains contain integral numbers of frames of various sizes. FIG. 2 shows an example of how this can be done. There the domain size is approximately 256 kilobytes (kb). In a preferred embodiment, the cache contains some 12 of such domains for a total capacity of approximately three megabytes. Three possible domain subdivision schemes are shown in FIG. 2.

FIG. 2A shows a scheme which might be adopted for a domain to be used with the Model 8650 disk drive sold by Storage Technology Corporation, the assignee of the present invention, in which each track contains some 19,069 bytes plus some indentifying "header" information. Thirteen such tracks with their headers will fit within the 256 kb domain. Storage Technology Corporation's Model 8375 disk drive has a track size of approximately 37,000 bytes. As shown in FIG. 2b, six such 37,000 kb tracks with headers will fit within the 256 kb domain. Finally, Storage Technology Corporation's Model 8380 disk drive has a 47,476 byte track size. FIG. 2c shows that five such frames together with headers fit well into the 256 kb domain size.

According to the present invention, dynamic repartitioning of cache space allocation is provided in accordance with usage. This allows high storage efficiency without severe fragmentation. Fragmentation is wastage of space due to lack of correspondence between the size of available frames and the sizes of the tracks that are to be stored in the available frames. Severe fragmentation is avoided because a domain may be reallocated from one device type to another by reframing whenever desirable. Reallocation occurs in only one domain at a time, thus providing stability and simplicity by eliminating the need to invalidate the entire cache design. A "domain use count" is kept to keep track of which class of domains is experiencing heavy usage. This makes it possible to determine whether the current allocation of the domains is the most efficient with respect to usage of the system at any particular time. This is discussed below in connection with FIGS. 3 and 4.

A preliminary problem which must be addressed is frame assignment, that is, picking the best frame to assign to a given track to be staged to the cache array. The "best frame" is one which is not currently assigned to any track. However, if no frames are free then a frame must be "detached" from the track to which it is currently assigned and reassigned to the new track which is to be staged. The best frame to detach is one which is no longer being read by the host. Frames which are still being read by the host should not be detached because overhead spent in staging the track would not be recovered if it is detached before the data is read. In a presently preferred embodiment of the invention, frame assignment is performed using a "least recently used" (LRU) scheme. The LRU scheme is implemented by means of a list of frames. The list has a top, at which is located the frames which have been most recently used, and a bottom, which corresponds to the frames which have not been used recently and those which are free. Thus when a frame is used, that is, is staged to or read from, its name is placed atop the list. When a frame is detached it is moved to the bottom of the list. This occurs when the host directs a write operation to the area on disk from which the contents of that frame were staged, thus rendering the data in that frame invalid, or when all records have been read from that track. Thus, the bottom of the list contains a free frame or the least recently used frame, and the frame on the bottom of the list will typically be the best to assign to a track to be staged. Of course, when the frame is assigned, it is moved to the top of the list, indicating that it is the most recently used.

Even given the LRU scheme, however, it may well be that if two or more classes of domains of different sizes are present in the cache memory, a first type will be much more heavily used than a second type so that the LRU list for the first domain type will have, for example, fewer free frames on it than the list of the second domain type. System performance, in general, can be improved by reallocating domains from the second type of storage to the first. This domain reallocation method allows for efficient use of cache space. Since the need for frames suited to a particular device will vary with time, it is particularly desirable to dynamically allocate and deallocate domains to device type based on demand. An important aspect of the present invention relates to an adaptive or dynamic domain allocation scheme; in a preferred embodiment, the invention supports two types of disk storage devices having differing track storage capacities and can reallocate domains from, e.g. device type A to device type B, although it would be possible to provide three or more class of domains in a given cache. In this way the cache space is allocated in proportion to the input/output activity.

According to the presently preferred embodiment of the invention, three questions are considered by the domain allocation decision-making process:

How often to switch domains?
When to switch a domain?
Which domain to switch?

With respect to the first question, domain switching is considered in the presently preferred embodiment on the order of once every 1000 stage operations, i.e., every 1000 times a data track is read into the cache memory. In a relatively large embodiment of the invention this is expected to occur approximately every 30 to 60 seconds.

The second problem is determining when to switch a domain. This decision should be based on an imbalance between the cache input/output activity ratios for device type A with respect to device type B. A suitable method of measuring activity is to count the stages to domains assigned to each device type. This stage count ratio should be equal to the ideal "frames available" ratio. In turn, the frames available ratio can be used to compute an ideal "domains allocated" ratio since the number of frames per domain is known. If the actual domains allocated ratio is different from the ideal domains allocated ratio it is time to switch domains. In this way the relative size of the various frames is removed from the consideration, as opposed to merely measuring domain type activity.

The third and most difficult problem is to determine which domain to switch. Domains with many recently used frames are clearly not good candidates for switching. The best domains to switch are instead those that have many old and free frames. Two alternatives may be considered. First, since the LRU list described above shows the relative age of the frames of each domain, the list can be used to determine which domain to switch. A scan of a predetermined number of frames on the list described above can be made, incrementing a counter for each domain when a frame belonging to that domain is found on the list. Accordingly, the domain having the lowest count at the end of the scan is that which is currently undergoing the least activity. The scan should be limited to the top portion of the list, because this is where activity occurs. It might seem that the lower end of the list could be most profitably looked at because this is where the old and invalid frames will congregate. However, if but a single active frame is in the same domain with a large number of old frames it would invalidated as well by the domain reallocation operation which would be undesirable. The second alternative is to count the stages to each domain rather than examine the least recently used frame list. This would again provide an indication of relative activity.

Thus, it will be clear that the domain switching scheme according to the invention has two portions: the decision making portion, which decides whether or not it is desirable to switch domains from one class to another, and the actual switching process, in which it is determined which domain is to be switched. In a particularly preferred embodiment, the decision making process is table driven in order to save execution time; that is to say, when the device is turned on, a look-up table indicating the ideal allocations of the domains for varying relative activity levels is generated and stored so that subsequent reallocation decisions can then simply be look-up processes not requiring an elaborate computation. Such a domain switch decision table usable in a preferred embodiment of the invention where the domain switching occurs between two device types is shown in FIG. 3.

The table is built by making all the possible domain switching decisions at post-IMPL time (that is, upon initial loading of the device) thus saving computation time when the decision is actually made. The decision thus becomes a simple table look up based on, e.g. the number of domains allocated to device type A and "A domain use"—a number representing actual staging operations from devices of the type A—at a particular time. In the embodiment of FIG. 3, the table shows numbers between zero and 15 (i.e., F, in hexadecimal) along the horizontal axis indicative of the relative number of stages to A device type domains. Each column thus represents the A-use figure. The table is built one horizontal "row" at a time with each row representing the number of domains allocated to device A at a given time. For each row, that is, for each number of domains allocated to A-type devices, there is thus an ideal target A-use. The table thus provides a correlation between the number of domains assigned to device A and the relative number of A stages in a given time. If the correspondence is not found then it is evident that domain switching should be performed. Target A use is calculated based on the assumption that the ideal cache partitioning is achieved when $$\frac{\text{frames } A}{\text{frames } B} = \frac{\text{stages } A}{\text{stages } B}$$

One can usefully define a term called "Target A Stages", this being the number of stages which would occur to domains assigned to device type A if the staging activity was in balance with cache allocation. This will lead to a target A frame use which can be compared with the actual A frame use to determine how close the actual stage activity compares with what would be ideal. Thus, in the table of FIG. 3 each of the horizontal rows represents a given number of domains allocated to a device. The target A use is then identical for that row. One of three indications is then filled in for each position of that row according to the actual use. A small a, indicating that a B to A domain reallocation is pending, i.e. desirable, is filled in if actual A use is greater than target A use, thus indicating that switching of a frame from B to A is an acceptable action if a request for an A frame assignment cannot be satisfied based on current allocation. Similarly, a small b indicating a pending switch from A to B is filled in if A use is less than target A use. Otherwise an n, indicating a "no switching required" condition is filled in.

As will be observed from Table III, several, typically 3, of the columns for each row have n's which indicate that no switch is pending. This is desirable in order to prevent unnecessary domain switching due to statistical variation in the number of stages per domain type over a short period of time which can be expected to occur, while not indicating that domain reallocation is called for. The plurality of n's in the columns thus provide a quasi-damping effect on the domain switching according to the invention.

As noted above, domain switching is initiated based on demand for a frame and on the value of a "domain switch pending" flag generated in the statistics keeping process. Thereafter, if data is to be cached and no frame for the proper device type is free, and a domain switch operation is pending which would provide a frame of the proper device type, the domain switching operation is initiated.

The first task performed in the domain switching operation is to decide which domain would be the best to switch. The least recently used list of the "from" device type is scanned to determine which domain has the fewest frames on the top half of the least recently used list. If this domain in turn has no frames marked "In use" or "Stage in Progress", it is presumed to be the best one to switch. Otherwise, the domain with the next fewest frames in the top of the least recently used list is chosen. Once a domain is chosen for switching, the domain is converted to the new device type. All valid frames belonging to the domain are deallocated. All frames in the domain are removed from the "from" device type least recently used list. The number of new frames that will fit into the new domain are linked onto the bottom of the new device type least recently used list. Finally, new pointers to the cache array are assigned for each frame according to the frame size of the new device type. Thus, when the domain conversion routine is finished, the new frames are at the bottom of the new device type least recently used frame list, and are marked free.

Figure 4:
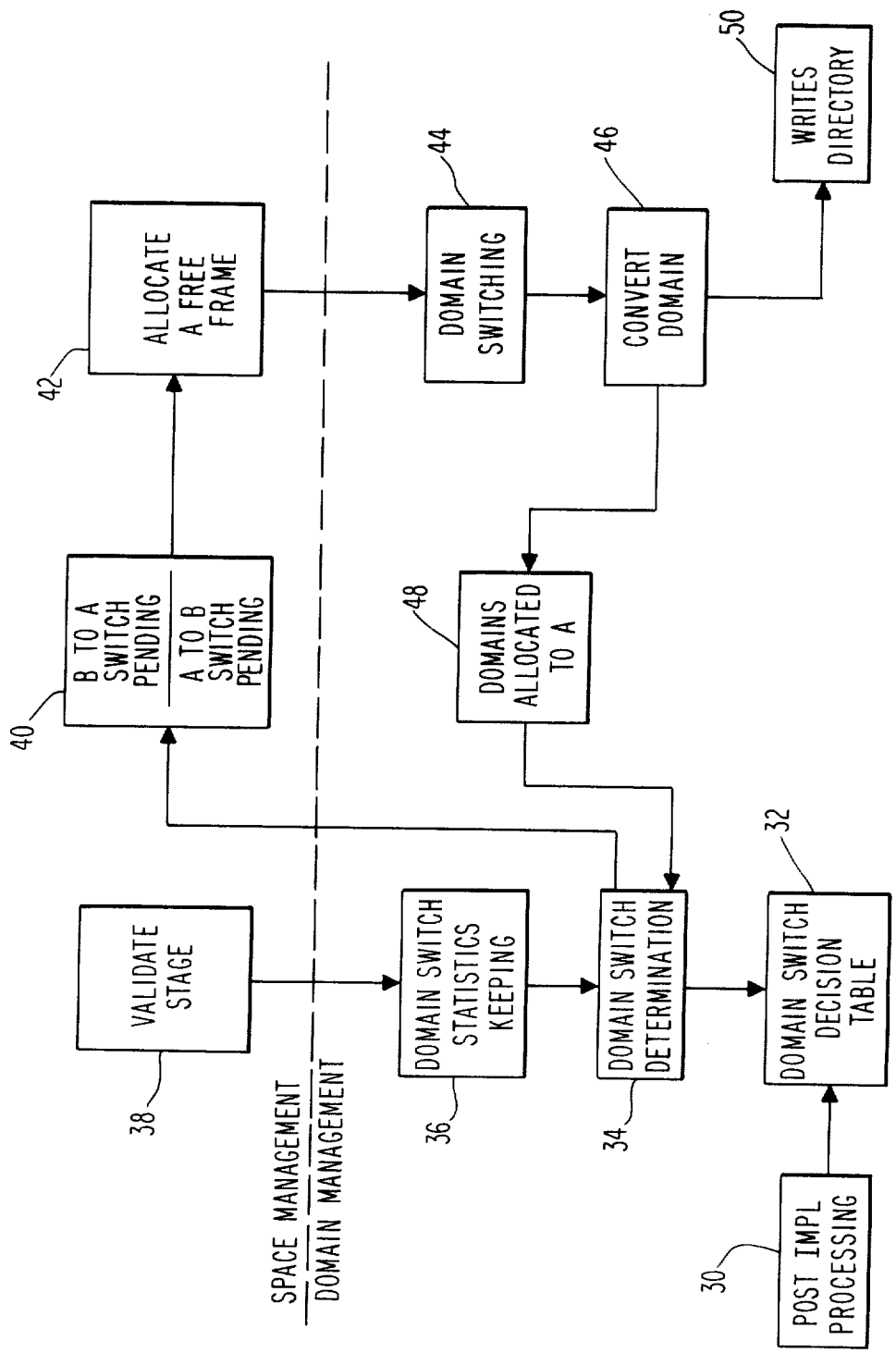
FIG. 4 shows a diagram indicating how the domain switching determination decision is utilized in actually performing the switching operation and how the control tables are updated as the scheme proceeds.

FIG. 4 shows a schematic view of the decision-making process according to the invention. As discussed above, at initial program load, "IMPL time", the table is written with all the possible decisions as at 32, the table then appearing as in FIG. 3. This information is then available to domain switch determination module 34. This decision making process is also supplied with domain switch statistics as at 36 which indicate whether domain usage is presently corresponding to domain allocation. Therefore, upon a stage request being validated as at 38 by the cache manager 24, (FIG. 1) as discussed in copending application Ser. No. 325,350 filed Nov. 27, 1981, the domain switch statistics may be examined to determine which, domain if any, should be switched. Typically, the operation is performed every, e.g., 1000 stages. If an imbalance is detected by accessing the table of FIG. 3 as at 32, a flag is set indicating that a switch is pending as at 40. Thereafter, upon a request that a frame be allocated to a data record at 42, if no free frame is available, and if an appropriate switch is pending, the least recently used domain is switched as described above as indicated at 44. The domain thus converted at 46 has now been allocated to the new device type, e.g. type A, and the table is updated to reflect this fact at 48, while the directory of frames available is likewise updated as at 50.

Attached hereto as Appendix A and incorporated herein by reference is a document entitled "Module: Domain Switching" which is a detailed description of methods used to perform the apparatus of the invention. This document is largely written in a form of convenient shorthand language referred to as pseudocode, the grammar of which is explained in a document also attached hereto and incorporated by reference, marked Appendix A-1, entitled "Chinook Pseudo Code Conventions". Those skilled in the art supplied with the domain switching document of Exhibit A together with the interpretative pseudocode convention document would have no difficulty implementing the methods of the invention.

Those skilled in the art will recognize that there has been described a domain partitioning system for dividing up a solid-state memory which fulfills the needs of the art and objects of the invention mentioned above. Specifically, use of domains having a size into which commonly accessed quantities of data, e.g., tracks, fit conveniently provides efficient storage of data without fragmentation as old records are overwritten by new data. More particularly, the provision of an adaptive domain switching scheme allows efficient utilization of memory to be achieved even when relative domain utilization changes from time to time. Furthermore, it will be appreciated that the method of the invention has applicability beyond the two device embodiment specifically described, and that therefore the description of the invention given above should not be considered as a limitation on its scope but only as exemplary thereof; the scope of the invention is more properly limited by the following claims.

APPENDIX A

MODULE: DOMAIN SWITCHING                                        FILE: MDFGDSC.

2.4.11.15 DOMAIN SWITCHING

```
***************** START OF SPECIFICATIONS *****************    00020
*                                                          *    00030
*                                                          *    00040
*   MODULE NAME: MDFGDSC1                                  *    00050
*                                                          *    00060
*   MODULE TITLE: DOMAIN SWITCHING MODULE                  *    00070
*                                                          *    00080
*   MODULE OWNER: Rick Coulson                             *    00090
*                                                          *    00100
*   FUNCTIONAL DESCRIPTION                                 *    00110
*   ----------   -----------                               *    00120
*   The Domain Switching module is responsible for switching a *    00130
*   domain from one device type to another. The 'best' domain to
```

```
switch is determined according to the following criteria:                    00140
                                                                             00150
1. The domain to be switched contains the least number                       00160
of frames that are 'active'. 'Active' means they are in the top              00170
half of the LRU list.                                                        00180
                                                                             00190
2. The domain to be switched may not contain a frame marked                  00200
'in use' or 'stage in progress'.                                             00210
                                                                             00220
In certain situations, it may be impossible to switch domains                00230
because criteria 2 above cannot be met. In this case an                      00240
indication is given that domain switching is not possible.                   00250
                                                                             00260
Any valid frames in the domain being switched are first                      00270
deallocated. After the switch is complete, the frames will be free           00280
and linked to the bottom of the LRU list for the new device type.            00290
The frame size and pointers to the Array are adjusted properly for           00300
the new device type.                                                         00310
                                                                             00320
The following tasks are part of Domain Switching:                            00330
                                                                             00340
- Calculate the 'best' domain to switch                                      00350
- Invalidate all frames in domain and remove from LRU list                   00360
- Convert domain and frames to new device type                               00370
- mark frames free                                                           00380
- link onto bottom of new device type LRU list                               00390
                                                                             00400
The entry parameter to this module is a code indicating whether              00410
to switch from device type A to B, or B to A. A return flag byte             00420
is returned to indicate whether or not the switching was successful.         00430
                                                                             00440
OPERATIONAL DESCRIPTION                                                      00450
-----------------------                                                      00460
The first step in Domain Switching is to determine the best domain           00470
to switch. An 'undesireability' count is established for each                00480
domain by scanning the 'from' device type LRU list. The frames in            00490
the first half of the list cause their corresponding domain's                00500
undesireability count to be incremented by 10. The frames in the             00510
lower half of the list cause the counter to be incremented by 1.             00520
If the frame is marked 'in use' or 'stage in progress', the                  00530
undesireability count is incremented by 2000. After the entire list          00540
has been scanned, the domain with the lowest non-zero undesireability        00550
count is the 'best' domain to switch. (A count of zero means the             00560
domain is allocated to the other device type.) If none of the                00570
counts are below 2000, no domain can be switched, since they all             00580
have a frame marked 'in use' or 'stage in progress'.                         00590
                                                                             00600
The second step is to switch the domain determined in step one as            00610
the 'best' one to switch. The frames are deallocated and taken off           00620
the old device type LRU list. The domain is converted to the                 00630
proper number of new frames and they are linked onto the bottom              00640
of the new device type LRU list. This second step is accomplished            00650
by the Domain Reformatting segment.                                          00660
                                                                             00670
SPECIAL CONSIDERATIONS                                                       00680
----------------------                                                       00690
Integrity -- The domain being switched must not have any frames              00700
              marked 'frame in use' or 'stage in progress'.                  00710
                                                                             00720
Future --     If writes are allowed to the Cache, the best domain            00730
              to switch will take into account the number of frames          00740
              that need to be destaged.                                      00750
                                                                             00760
Future --     If a domain has a frame that is pinned, that domain            00770
              may not be switched.                                           00780
                                                                             00790
Timing --     If the decision process takes too long it may be               00800
              better to just pick an arbitrary domain to switch              00810
              or chose an alternate algorithm.                               00820
                                                                             00830
INTERNAL ITEMS     NAME         DESCRIPTION/PARAMETERS                       00840
--------------     ----         ----------------------                       00850
ENTRY POINT(S):    MDFGDSC1     ENTRY PARAMETERS   -   PASS REGISTERS        00860
                                FLAG BYTE          -   XXXXXXXX              00870
                                  Bit 0=0 --> Switch from A to B             00880
                                  Bit 0=1 --> Switch from B to A             00890
                                                                             00900
```

```
*   NORMAL EXIT(S):   caller        RETURN PARAMETERS  -  RETURN REGISTERS  *   00910
*                                   RETURN FLAG        -  XXXXXXXX          *   00920
*                                       Bit 0=0 --> Switch Occurred         *   00930
*                                       Bit 0=1 --> No Switch Occurred      *   00940
*   ERROR EXIT(S):   none         >                                         *   00950
*   ROUTINES USED:   MDFGDSA7     Deallocate                                *   00960
*                    MDFGDSS1     Reformat Domain Segment                   *   00970
*   MACROS USED:     >            >                                         *   00980
*   DATA STRUCTURES: MDDGDT01     R/W      Directory (DIR)                  *   00990
*                    MDDGDT09     R/R      Space Status Table (SST)         *   01000
*                    MDDGDT11     R/W      Directory Status Table (DRS)     *   01010
*                                                                           *   01020
*   INTERNAL REGS:   >            >(R/W)  >                                 *   01030
*                                                                           *   01040
*   EXTERNAL REGS:   >            >(R/W)  >                                 *   01050
*                                                                           *   01060
*   ENTRY IRG:       >            EXIT IRG: >                               *   01070
*                                                                           *   01080
*                                                                           *   01090
*   CHANGE ACTIVITY                                                         *   01100
*   ------ --------                                                         *   01110
*   01/09/81         START                                                  *   01120
*   02/10/81         D1 SCHEDULED (prolog)                                  *   01130
*   02/10/81         D1 COMPLETED                                           *   01140
*   05/19/81         I1 SCHEDULED (pseudo code)                             *   01150
*   05/19/81         I1 COMPLETED                                           *   01160
*   MM/DD/YY         I2 SCHEDULED (real code)                               *   01170
*   MM/DD/YY         I2 COMPLETED (MODULE SIZE = ??? words)                 *   01180
*                                                                           *
***************** END OF SPECIFICATIONS **********************              01190
START MDFGDSC1                                                              01210
        ORG  MDFGDSC1                                                       01220
MDFGDSC1.                                                                   01230
                                                                            01240
*   ENTRY Domain Switching                                                  01250
*                                                                           01260
*   IF 'switch from B to A' code passed                                     01270
*     THEN set from device type to 'B'                                      01280
*     ELSE set from device type to 'A'                                      01290
*                                                                           01300
*   (Determine the 'best' domain to switch)                                 01310
*   Set upper-half-count to number of frames allocated for 'from' device    01320
*     type divided by 2 (right shift)                           (DST)       01330
*   Find top of 'from' linked list                                          01340
*   Zero undesireability counts                                             01350
*                                                                           01360
*   DO-WHILE not end of list                                                01370
*     Find next entry on list                                               01380
*     IF upper-half-count not zero                                          01390
*       THEN-DO for upper half count not zero                               01400
*         Increment undesireability-count corresponding to frame by 10      01410
*         Decrement upper-half-count by one                                 01420
*       END-THEN for upper half count not zero                              01430
*       ELSE increment undesireablty-count corresponding to frame by 1      01440
*     IF frame marked in use or stage in progress                           01450
*       THEN increment proper undesireability-count by 2000                 01460
*   END-WHILE not end of list                                               01470
*                                                                           01480
*                                                                           01490
*   Set domain-number to 1                                                  01500
*   Set minvalue to 2000                                                    01510
*   Set domainid to 0                                                       01520
*                                                                           01530
*   DO-WHILE domain-number not greater than number-of-domains               01540
*     IF undesireability-count for this domain is less than minvalue        01550
*       THEN-DO for undesireability-count is less than minvalue             01560
*         Set domainid to domain-number                                     01570
*         (domainid is the new 'best' domain to switch)                     01580
*         Set minvalue to undesireability-count                             01590
*         (minvalue is the new 'value' to beat to be the best domain to     01600
*           switch)                                                         01610
*       END-THEN for undesirability-count less than minvalue                01620
*     Increment domain-number to point to next domain                       01630
*   END-WHILE domain-number not greater than number of domains              01640
*                                                                           01650
*   (The domain identified by domainid is the best domain to switch,       01660
*     if it contains 0, then no domain was suitable to switch)              01670
*                                                                           01680
```

```
*  IF domainid not zero (a domain is suitable to switch)                        01690
*    THEN-DO for domainid not zero                                              01700
*      INCLUDE Convert Domain                                                   01710
*      Subtract 'from' frames per domain from 'from' number of frames           01720
*          allocated (DST)                                                      01730
*      Add 'to' frames per domain to 'to' number of frames allocated(DST)       01740
*      Increment 'to' number of domains allocated by 1 (DST)                    01750
*      Decrement 'from' number of domains allocated by 1 (DST)                  01760
*      Set domain switched return flag                                          01770
*    END-THEN for domainid not zero                                             01780
*    ELSE set no switch return flag                                             01790
*                                                                               01800
* RETURN                                                                        01810
END                                                                             01820

MODULE: DOMAIN SWITCHING
SEGMENT: CONVERT DOMAIN                              FILE: MDFGDSS1 ASM 2.4.11.15.1 SEGMENT: CONVERT DOMAIN
-----------------------------------

******************* START OF SPECIFICATIONS *********************              00020
*                                                                 *             00030
*   SEGMENT NAME: MDFGDSS1                                        *             00040
*                                                                 *             00050
*                                                                 *             00060
*   SEGMENT TITLE: CONVERT DOMAIN                                 *             00070
*                                                                 *             00080
*                                                                 *             00090
*   PARENT MODULE NAME: MDFGDSC1                                  *             00100
*                                                                 *             00110
*   FUNCTIONAL DESCRIPTION                                        *             00120
*   ----------- -----------                                       *             00130
*                                                                 *             00140
*   The Convert Domain module is used to reformat a domain from   *             00150
*   one device type to another. It includes deallocating the frames*            00160
*   of the old device type and converting them to the new device type.*         00170
*   The frames for the new device type are linked to the bottom of the*         00180
*   LRU list for that device type.                                *
*                                                                 *
******************* END OF SPECIFICATIONS ***********************              00180
MDFGDSS1                                                                        00200
                                                                                00210
* (start of segment)                                                            00220
*                                                                               00230
* Use Domain Descriptor to get pointer to first frame belonging to              00240
*     this frame in the directory (DDT)                                         00250
* Set count to zero                                                             00260
*                                                                               00270
* DO-WHILE count less than 'from' frames per domain                             00280
*   IF frame status is valid                                                    00290
*     THEN-DO for valid frame                                                   00300
*       CALL Deallocate Frame                                                   00310
*         PASS: DID.C.C.H for this frame                                        00320
*         RECEIVE: Return flags                                                 00330
*     END-THEN for valid frame                                                  00340
*   IF frame status 'permanent error'                                           00350
*     THEN decrement frames in error byte (CST?) (frame already off LRU)        00360
*     ELSE-DO for frame not in error                                            00370
*       Set forward pointer of frame pointed to by this frame's backward        00380
*           pointer to this frame's forward pointer.                            00390
*       Set backward pointer of frame pointed to by this frame's forward        00400
*           pointer to this frame's backward pointer                            00410
*     END-ELSE for frame not in error                                           00420
*   Increment count by one                                                      00430
*   Point to next frame                                                         00440
* END-WHILE count less than 'from' frames per domain                            00450
*                                                                               00460
* Point to first frame in domain                                                00470
* Set new-frames to number of frames per domain for 'to' device (DTD)           00480
* Set pointer-to-array zero                                                     00490
* Set count to zero                                                             00500
*                                                                               00510
* DO-WHILE count less than new-frames                                           00520
*   Change frame status to free                                                 00530
*   Use device type to get bottom of 'to' device type's LRU list (SST)          00540
*   Set this frame's backward pointer to bottom's backward pointer              00550
*   Set previous frame's forward pointer to this frame                          00560
*   Set bottom's backward pointer to this frame                                 00570
```

```
*    Set this frame's forward pointer to bottom                        00580
*    Set this frame's BOT.BOT to pointer-to-array                      00590
*    Increment pointer-to-array by frame size of 'to' device type (DTD) 00600
*    Increment count by one                                            00610
*    Point to next frame descriptor                                    00620
* END-WHILE count less than new-frames                                 00630
*                                                                      00640
* DO-WHILE count less than frame-slots-per-domain                      00650
*    Mark frame descriptor as undefined                                00660
*    Increment count by one                                            00670
* END-WHILE count less than frame-slots-per-domain                     00680
*                                                                      00690
* (end of segment)                                                     00700
END                                                                    00710
```

MODULE: DOMAIN SWITCHING STATISTICS KEEPING          FILE: MDFGDSC2 ASM 2.4.11.16 DOMAIN SWITCHING STATISTICS KEEPING

```
*****************   START OF SPECIFICATIONS   *********************    00020
*                                                                  *   00030
* MODULE NAME: MDFGDSC2                                            *   00040
*                                                                  *   00050
* MODULE TITLE: DOMAIN SWITCHING STATISTIC KEEPING                 *   00060
*                                                                  *   00070
* MODULE OWNER: Rick Coulson                                       *   00080
*                                                                  *   00090
* FUNCTIONAL DESCRIPTION                                           *   00100
* ----------  -----------                                          *   00110
* The Domain Switching Statistic Keeping module keeps statistics   *   00120
* by device type to aid in determining when to switch a domain from*   00130
* one device type to another. The module keeps a count of how many *   00140
* stages have occurred by device type. The counts are used by      *   00150
* the Domain Switching Determination module in making its deter-   *   00160
* mination. The Statistic Keeping module is also responsible for   *   00170
* calling the Domain Switching Determination module every 1024 stages.* 00180
* Thus a total stage count is also kept to indicate when enough    *   00190
* stages have occurred to reevaluate.                              *   00200
*                                                                  *   00210
* The following tasks are part of Domain Switching Stat Keeping:   *   00220
*                                                                  *   00230
*  - Increment total stage count                                   *   00240
*  - Increment stage count of correct device type                  *   00250
*  - If stage count exceeds threshold (1024 stages)                *   00260
*     - call domain switch decision module                         *   00270
*     - clear domain switch statistics                             *   00280
*                                                                  *   00290
* No parameters are passed to this module. The device type         *   00300
* is read from the Space Management Status Table. No parameters are*   00310
* returned.                                                        *   00320
*                                                                  *   00330
* OPERATIONAL DESCRIPTION                                          *   00340
* -----------  -----------                                         *   00350
* Domain Switching Statistics Keeping checks to see if multiple    *   00360
* device types are configured. If not, the module merely returns to*   00370
* the caller. If multiple device types are configured, the total   *   00380
* stage count and the appropriate device type stage count are      *   00390
* incremented. If the total stage count exceeds a threshold, the   *   00400
* Domain Switch Determination module is called to make a switch    *   00410
* decision and the stage counts are zeroed.                        *   00420
*                                                                  *   00430
* SPECIAL CONSIDERATIONS                                           *   00440
* -------  --------------                                          *   00450
* none                                                             *   00460
*                                                                  *   00470
* INTERNAL ITEMS    NAME      DESCRIPTION/PARAMETERS               *   00480
* -------- -----    ----      ----------------------               *   00490
* ENTRY POINT(S):   MDFGDSC2  none                                 *   00500
* NORMAL EXIT(S):   caller    none                                 *   00510
* ERROR EXIT(S):    none,     >                                    *   00520
* ROUTINES USED:    MDFGDSC3  Domain Switching Determination       *   00530
* MACROS USED:      >         >                                    *   00540
* DATA STRUCTURES:  MDDGDT11  R/W     Directory Status Table (DRS) *   00550
*                   MDDGDT09  R/R     Space Status Table (SST)     *   00560
```

```
*   INTERNAL REGS:     >         >(R/W)  >                          *    00570
*   EXTERNAL REGS:     >         >(R/W)  >                          *    00580
*                                                                   *    00590
*   ENTRY IRG:         >         EXIT IRG:  >                       *    00600
*                                                                   *    00610
*   CHANGE ACTIVITY                                                 *    00620
*   ------ --------                                                 *    00630
*   01/09/81           START                                        *    00640
*   02/10/81           D1 SCHEDULED (prolog)                        *    00650
*   02/10/81           D1 COMPLETED                                 *    00660
*   05/19/81           I1 SCHEDULED (pseudo code)                   *    00670
*   05/19/81           I1 COMPLETED                                 *    00680
*   MM/DD/YY           I2 SCHEDULED (real code)                     *    00690
*   MM/DD/YY           I2 COMPLETED (MODULE SIZE = ??? words)       *    00700
*                                                                   *    00710
************************ END OF SPECIFICATIONS *********************     00720
START MDFGDSC2                                                           00740
        ORG MDFGDSC2                                                     00750
MDFGDSC2                                                                 00760
                                                                         00770
* ENTRY Domain Switch Statistic Keeping                                  00780
*                                                                        00790
* IF 'multiple device types' flag on (DRS)                               00800
*   THEN-DO for multiple device types                                    00810
*     Increment total stage count (DRS)                                  00820
*     Get device type from Space Status Table (SST)                      00830
*     IF device type A                                                   00840
*       THEN increment device type A stage count (DRS)                   00850
*       ELSE increment device type B stage count (DRS)                   00860
*     IF total stage count is 1024                                       00870
*       THEN-DO for stage count of 1024                                  00880
*         Divide A stage count by 16 to get A-use (16 will need to be    00890
*         adjusted if 1024 threshold is changed)                         00900
*         CALL Domain Switch Determination                               00910
*           PASS: A-use                                                  00920
*           RECEIVE: none                                                00930
*         Set total stage count to 0 (DRS)                               00940
*         Set A stage count to 0 (DRS)                                   00950
*         Set B stage count to 0 (DRS)                                   00960
*       END-THEN for stage count of 1024                                 00970
*   END-THEN for multiple device types                                   00980
*                                                                        00990
* RETURN                                                                 01000
END                                                                      01010
```

MODULE: DOMAIN SWITCHING DETERMINATION                    FILE: MDFGDSC3 ASM

2.4.11.17 DOMAIN SWITCHING DETERMINATION

```
*********************** START OF SPECIFICATIONS ********************     00020
*                                                                   *    00030
*   MODULE NAME: MDFGDSC3                                           *    00040
*                                                                   *    00050
*   MODULE TITLE: DOMAIN SWITCHING DETERMINATION                    *    00060
*                                                                   *    00070
*   MODULE OWNER: Rick Coulson                                      *    00080
*                                                                   *    00090
*   FUNCTIONAL DESCRIPTION                                          *    00100
*   ---------- -----------                                          *    00110
*   The Domain Switching Determination module is used to determine  *    00120
*   if the Cache space allocation by device type compared to stage  *    00130
*   activity by device type indicates that a domain should be       *    00140
*   switched. If appropriate, this module sets flags indicating that a * 00150
*   domain should be switched from one device type to another.      *    00160
*                                                                   *    00170
*   A-use, a measure of the activity on device type A, is passed to *    00180
*   this module. No parameters are returned to the caller.          *    00190
*                                                                   *    00200
*   OPERATIONAL DESCRIPTION                                         *    00210
*   ----------- -----------                                         *    00220
*   Domain Switching Decision -- The domain switching decision      *    00230
*   process is table driven. The decision table is constructed at   *    00240
*   IMPL time based on device type frame sizes and Cache size (see  *    00250
*   MDDGDT12 Domain Switch Decision Table). The table is referenced *    00260
*   by the number of stages to device type A and the number of domains * 00270
```

```
*   allocated to device type A to obtain the proper values for the        *   00280
*   domain switch pending flags.                                          *   00290
*                                                                         *   00300
*   SPECIAL CONSIDERATIONS                                                *   00310
*   ---------------------                                                 *   00320
*   none                                                                  *   00330
*                                                                         *   00340
*   INTERNAL ITEMS    NAME       DESCRIPTION/PARAMETERS                   *   00350
*   --------------    ----       ---------------------                    *   00360
*   ENTRY POINT(S):   MDFGDSC3   A-use     pX                             *   00370
*   NORMAL EXIT(S):   caller     none                                     *   00380
*   ERROR EXIT(S):    none       >                                        *   00390
*   ROUTINES USED:    none       >                                        *   00400
*   MACROS USED:      >          >                                        *   00410
*   DATA STRUCTURES:  MDDGDT11   R/R       Directory Status Table (DRS)   *   00420
*                     MDDGDT12   R/R       Domain Switch Decision (DSD)   *   00430
*   INTERNAL REGS:    >          >(R/W)  >                                *   00440
*   EXTERNAL REGS:    >          >(R/W)  >                                *   00450
*                                                                         *   00460
*   ENTRY IRG:        >          EXIT IRG: >                              *   00470
*                                                                         *   00480
*   CHANGE ACTIVITY                                                       *   00490
*   ---------------                                                       *   00500
*   01/09/81          START                                               *   00510
*   02/10/81          D1 SCHEDULED (prolog)                               *   00520
*   02/10/81          D1 COMPLETED                                        *   00530
*   05/19/81          I1 SCHEDULED (pseudo code)                          *   00540
*   05/19/81          I1 COMPLETED                                        *   00550
*   MM/DD/YY          I2 SCHEDULED (real code)                            *   00560
*   MM/DD/YY          I2 COMPLETED (MODULE SIZE = ??? words)              *   00570
*                                                                         *   00580
***************** END OF SPECIFICATIONS ************************              00590
START MDFGDSC3                                                                00610
      ORG MDFGDSC3                                                            00620
MDFGDSC3                                                                      00630
                                                                              00640
* ENTRY Domain Switch Determination                                           00650
*                                                                             00660
* Reset 'domain switch A to B pending' flag off (DRS)                         00670
* Reset 'domain switch B to A pending' flag off (DRS)                         00680
*                                                                             00690
* IF a-use = 16 (all stages were for device A)                                00700
*    THEN set a-use to 15                                                     00710
* Do table lookup based on a-use and number of domains allocated to A         00720
* IF A to B pending table return                                              00730
*    THEN set 'domain switch A to B pending' flag (DRS)                       00740
* IF B to A pending table return                                              00750
*    THEN set 'domain switch B to A pending' flag (DRS)                       00760
*                                                                             00770
* RETURN                                                                      00780
END                                                                           00790
```

APPENDIX A-1

DMR814
CHINOOK PSEUDO CODE CONVENTIONS

FROM: RON ELICKENSTAFF

CC: CHINOOK Group

DATE: 11/14/80    LATEST REVISION: 04/07/81

The pseudo code language used for the CHINOOK project will consist of the following pseudo code control keywords. The purpose of the keywords is twofold: First, consistancy between microcoders is achieved. It is much easier to understand another persons code if it looks similar to your own code. Second, the module becomes much more structured by using standard conventions for decisions, loops, and linkage.

Listed below are the pseudo keywords, followed by examples of their use. One of the primary benefits of pseudo code is to separate code into small cohesive units. Thus, the pseudo language is designed to block code by using 'DO' 'END' groups.

Conventions

1) All pseudo code keywords must be capitalized. When two keywords appear together (END-THEN), they will be hyphenated.

2) Pseudo code will begin in column three and each level of nesting will be indented two spaces.

3) The use of Set, Reset, and Initialize words in comments and pseudo code is often ambigous. These words often mean one thing to the author while the reader may interpret them differently. By being a little more explicit, this confusion could be eliminated. Such as:

Not -- Set the 'Cache Mode' flag
   But -- Set the 'Cache Mode' flag on
   Not -- Reset the 'Cache Mode' flag
   But -- Reset the 'Cache Mode' flag to zero
   Not -- Reset the print buffer
   But -- Reset the print buffer to blanks (x40)
   Not -- Initialize the Status Table
   But -- Initialize the Status Table to zeros (x00)
   Not -- Initialize the print buffer
   But -- Initialize the print buffer to blanks (x40)

DECISIONS

Keywords:

IF
THEN (NULL)
ELSE (NULL)
THEN-DO
END-THEN
ELSE-DO
END-ELSE

All decisions must begin with the 'IF' keyword. The next part of the pseudo code depends on what action is performed. If for example, the positive leg of the test consists of only one pseudo instruction the 'THEN' form of the code is used. If the leg consists of two or more pseudo instructions the 'THEN-DO', 'END-THEN' form is used.

The NULL keyword is used for pseudo code completeness, but does not result in real code other than possibly a branch. If a test is made on one condition but the action is performed on the other, the THEN leg becomes null and the THEN NULL statement must be used. If the ELSE leg is null, the ELSE NULL statement is optional. The NULL is not part of the THEN or ELSE keyword, but is the action performed. Thus, it is not hyphenated.

Examples:

IF the enable/disable switch is disabled
  THEN set the disable flag on

```
IF the enable/disable switch is disabled
  THEN-DO for disabled
    Set the disable flag on
    Setup to notify the cache director
  END-THEN for disabled IF the enable/disable switch is disabled
  THEN set the disable flag on
  ELSE set the enable flag on IF the enable/disable switch is disabled
  THEN-DO for disabled
    Set the disable flag on
    Setup to notify the cache director
  END-THEN for disabled
  ELSE-DO for enabled
    Set the enable flag on
    Setup to continue
  END-ELSE for enabled

| IF The 'Deselection Reset' or 'Check 1 Reset' flags are on and
|    The 'Table Update In Progress' and 'Reset Pending' flags are off
|   THEN NULL for partial reset
|   ELSE-DO for full reset
|     Reset the 'Deselection Reset' flag to zero
|     Reset the 'Check 1 Reset' flag to zero
|   END-ELSE for full reset
```

LOOPS

Keywords:

DO-WHILE
END-WHILE

DO-UNTIL
END-UNTIL

WAIT

HALT

Loops are coded in several ways. Either the check for the exit from the loop is done at the beginning of the loop or at the end. If it is done at the end, then the loop will always be executed at least once. The DO-WHILE has the check in the beginning while the DO-UNTIL checks at the end.

A third type of loop is a one word loop which spins on a condition, waiting for the condition to come or go away. These are coded using the WAIT keyword.

| A fourth type of loop is a one word loop which is used
| during the debug phase of a product. It is used to detect
| internal logic problems that should not occur and are
| normally not even coded because it would be to expensive. To
| attempt to find these problems during the testing phase, the
| HALT keyword is used. The HALT statements result in
| execution of a macro which does a one word loop during the
| test phase. When the product is shipped, the macro can be
| changed to a NOP or to a generalized recovery routine.

Examples:

```
DO-WHILE there are valid entries in the directory
  Save the device type in the LRU table
```

```
   Save the time stamp in the LRU table
END-WHILE

DO-UNTIL
   Save the device type in the LRU table
   Save the time stamp in the LRU table
END-UNTIL there are no valid entries in the directory WAIT for tag valid to rise HALT because the Cache Directory indicates 'Stage in Progress'
```

ROUTING

Keywords:

```
SELECT
WHEN
DO-WHEN
END-WHEN
OTHERWISE (NULL)
DO-OTHERWISE
END-OTHERWISE
END-SELECT
```

The case form of this pseudo code will use the SELECT, WHEN, OTHERWISE, keywords. It is used to select only one option when there are many to choose from. The WHEN keyword is used to select the options you need to process, while the OTHERWISE keyword is used at the end of the select structure to catch the remaining or invalid options. In any SELECT structure the OTHERWISE keyword must always be used. If no action is to be taken in the OTHERWISE, then the OTHERWISE NULL statement must be used.

If there are only two options then a simple IF, THEN, ELSE, structure would suffice. If there is more than one option possible then the IF, THEN with a null ELSE structure would be used.

Example:

```
SELECT on tag
   DO-WHEN a poll command - tag 02
      CALL poll module
         PASS: tag, command
         RECEIVE: response for bus-in
      Set response in bus-in
      Send response
   END-WHEN for poll command - tag 02
   .
   .
   .
   WHEN read or write command - tags 0E or 0F
      CALL space management
         PASS: tag, command, length, parms
         RECEIVE: return code, status, data
   WHEN read or write diagnostic command - tag 0C or 0D
      CALL diagnostic management
         PASS: tag, command, length, parms
         RECEIVE: return code, status, data
   OTHERWISE for an invalid tag
      Set invalid tag return code
END-SELECT on tag
```

LINKAGE

Keywords:

ENTRY
  ENTRY PARMS:
CALL
  PASS:
  RECEIVE:
TRANSFER
INCLUDE
RETURN

These keywords are used to block a module, or pass control to another module. The ENTRY PARMS field on the ENTRY keyword, and the PASS and RECEIVE fields on the CALL keyword are designed to force narrow interfaces. You should always be able to state exactly what parameters are exchanged.

The CALL keyword is used when a module or subroutine is being invoked and return is expected. If a return is not expected, then the TRANSFER keyword is used. TRANSFER should only be used in special situations such as Reset TRANSFERring control back to the Idle Loop.

The INCLUDE keyword is used to include a segment of code inline into the module. Segments are created to package a module into small logically cohesive units. They are used instead of subroutines because they are invoked in only one place, thus Example:

ENTRY space manager
  ENTRY PARMS: tag, command code, length and command parameters
SELECT by command
  DO-WHEN a directory search
    Set DA.CC.H parameter for search routine
    CALL Search Routine to see if entry is in the Cache
      PASS: DID.C.C.H
      RECEIVE: Found/ Not found
    IF DA.CC.H was found
      THEN Set found indicator on
      ELSE Reset found indicator to zero
    Save the DA.CC.H in the device table
  END-WHEN for directory search
  WHEN a read frame id
    INCLUDE the read frame id segment
  .
  .
  .
END-SELECT by command
RETURN to caller with status and return parameters

We claim:
1. In a method of dividing a memory array into domains for the convenient storage of data, said data being received in plural differing predetermined amounts from plural classes of storage devices, said amounts being determined in accordance with physical characteristics of the respective class of storage devices, the improvement which comprises:
  subdividing said array into domains of sizes which are substantially integral multiples of said plural predetermined amounts of data to be stored therein.

2. The improvement of claim 1 wherein each of said domains is allocated to one class of device at an initialization stage.

3. The improvement of claim 2 wherein the allocation of said domains may be varied from device class to device class over time, said variation being controlled in accordance with the ratio of the number of domains allocated to a particular device type of relative usage of said domains.

4. The improvement of claim 1 wherein said predetermined amounts of data are equivalent to complete tracks of data stored on magnetic disk storage media.

5. A method of organizing an array of memory locations to be used to store data records of plural differing predetermined lengths, said lengths being determined by physical characteristics of associated magnetic data storage devices, comprising the steps of:

determining a domain size the capacity of which is substantially an integral multiple of the lengths of said plural predetermined data lengths to be stored in said array;

effectively dividing said array into the thus determined domains;

allocating each of said domains to storage of record each record being one of said predetermined data lengths; and effectively dividing each of said allocated domains into frames, each frame having storage capacity corresponding to the length of the records to the storage of which the domain is allocated.

6. The method of claim 5 wherein the allocation of each of said domains may be varied over time in accordance with usage of each of said classes of domains.

* * * * *